United States Patent
Lee et al.

(10) Patent No.: US 10,471,827 B2
(45) Date of Patent: Nov. 12, 2019

(54) DIFFERENTIAL WITH DISCONNECT CLUTCH

(71) Applicant: Schaeffler Technologies AG & Co. KG, Herzogenaurach (DE)

(72) Inventors: Brian Lee, York, SC (US); Tomas Smetana, Yokohama (JP); Jeffrey Hemphill, Copley, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 263 days.

(21) Appl. No.: 15/694,197

(22) Filed: Sep. 1, 2017

(65) Prior Publication Data

US 2019/0070955 A1 Mar. 7, 2019

(51) Int. Cl.
| | | |
|---|---|---|
| F16D 15/00 | (2006.01) |
| F16H 48/10 | (2012.01) |
| B60K 23/04 | (2006.01) |
| F16D 25/00 | (2006.01) |
| F16D 27/108 | (2006.01) |
| F16D 41/061 | (2006.01) |
| F16H 48/11 | (2012.01) |

(52) U.S. Cl.
CPC ............. B60K 23/04 (2013.01); F16D 15/00 (2013.01); F16D 25/00 (2013.01); F16D 27/108 (2013.01); F16D 41/061 (2013.01); F16H 48/11 (2013.01); *F16H 2048/106* (2013.01); *F16H 2048/108* (2013.01)

(58) Field of Classification Search
CPC .............. F16H 48/11; F16H 2048/108; F16H 2048/106; F16D 27/108; F16D 15/00; F16D 41/061; F16D 41/063; F16D 41/082
See application file for complete search history.

(56) References Cited

U.S. PATENT DOCUMENTS

| 6,015,361 | A | * | 1/2000 | Yamazaki | ............... | F16H 48/08 |
|---|---|---|---|---|---|---|
| | | | | | | 180/247 |
| 7,175,557 | B2 | * | 2/2007 | Kirkwood | .......... | B60K 17/3467 |
| | | | | | | 475/150 |
| 9,518,643 | B2 | | 12/2016 | Schimpf et al. | | |
| 2014/0335992 | A1 | | 11/2014 | Lee et al. | | |
| 2017/0114871 | A1 | | 4/2017 | Linton | | |
| 2019/0063510 | A1 | * | 2/2019 | Lee | ........................ | F16D 41/061 |
| 2019/0128341 | A1 | * | 5/2019 | Ohr | ........................ | F16D 41/063 |

* cited by examiner

*Primary Examiner* — Sherry L Estremsky
(74) *Attorney, Agent, or Firm* — Volpe and Koenig, P.C.

(57) ABSTRACT

A differential arrangement including a wedge clutch assembly is provided. The wedge clutch assembly includes a cage with a first plurality of tapered crossbars to at least partially define a plurality of tapered wedge pockets. A plurality of wedges are each arranged within a respective one of the plurality of wedge pockets and within a circumferential groove of an input drive gear or a differential assembly. An actuator assembly is configured to move the cage in at least one of a first axial direction or a second axial direction. Movement of the first plurality of tapered crossbars in one of the first axial direction or the second axial direction circumferentially drives the plurality of wedges into contact with the circumferential groove such that the input drive gear drives the differential assembly.

18 Claims, 5 Drawing Sheets

DIFFERENTIAL WITH DISCONNECT CLUTCH

FIELD OF INVENTION

This invention is generally related to a differential arrangement, and is more particularly related to a disconnect clutch for a differential arrangement.

BACKGROUND

Electric drive axles are well known in the art as a secondary driveline for a hybrid vehicle. These known axles often disconnect the electric motor from the wheels during relatively higher vehicle speeds to prevent over-running of the motor. It is known to use a dog clutch to "break" a shaft in order to disconnect torque being supplied to the associated wheels. Other known types of disconnect arrangements include using a dog clutch or wet clutch pack to disconnect torque between a final drive gear and a disconnect carrier. Clutches generally require additional space in drive assemblies, which is undesirable due to the desire to make systems as compact as possible.

SUMMARY

A differential arrangement including a compact disconnect configuration for a differential assembly is provided. The differential arrangement includes an input drive gear and a differential assembly adapted to be selectively driven by the input drive gear. A first one of the input drive gear or the differential assembly includes a plurality of ramps, and a second one of the input drive gear or the differential assembly includes a circumferential groove. A wedge clutch assembly includes a cage having a first plurality of tapered crossbars that at least partially define a plurality of tapered wedge pockets. A plurality of wedges are each arranged within a respective one of the plurality of wedge pockets and within the circumferential groove of the second one of the input drive gear or the differential assembly. The plurality of wedges each include a ramped surface facing a corresponding one of the plurality of ramps. An actuator assembly is configured to move the cage in at least one of a first axial direction or a second axial direction. Movement of the first plurality of tapered crossbars in one of the first axial direction or the second axial direction circumferentially drives the plurality of wedges into contact with the circumferential groove such that the input drive gear drives the differential assembly.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
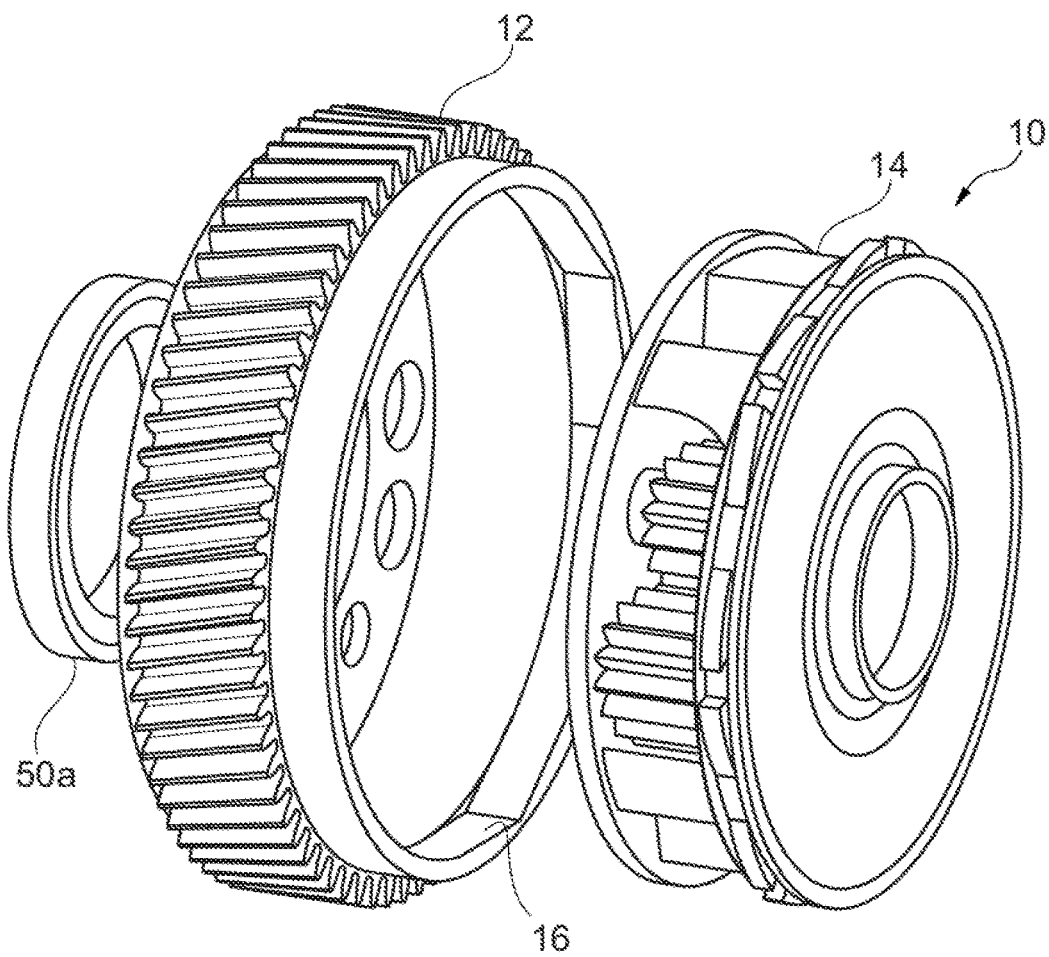
FIG. 1 is an exploded view of a input drive gear and a differential assembly of a differential arrangement according to an embodiment of the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
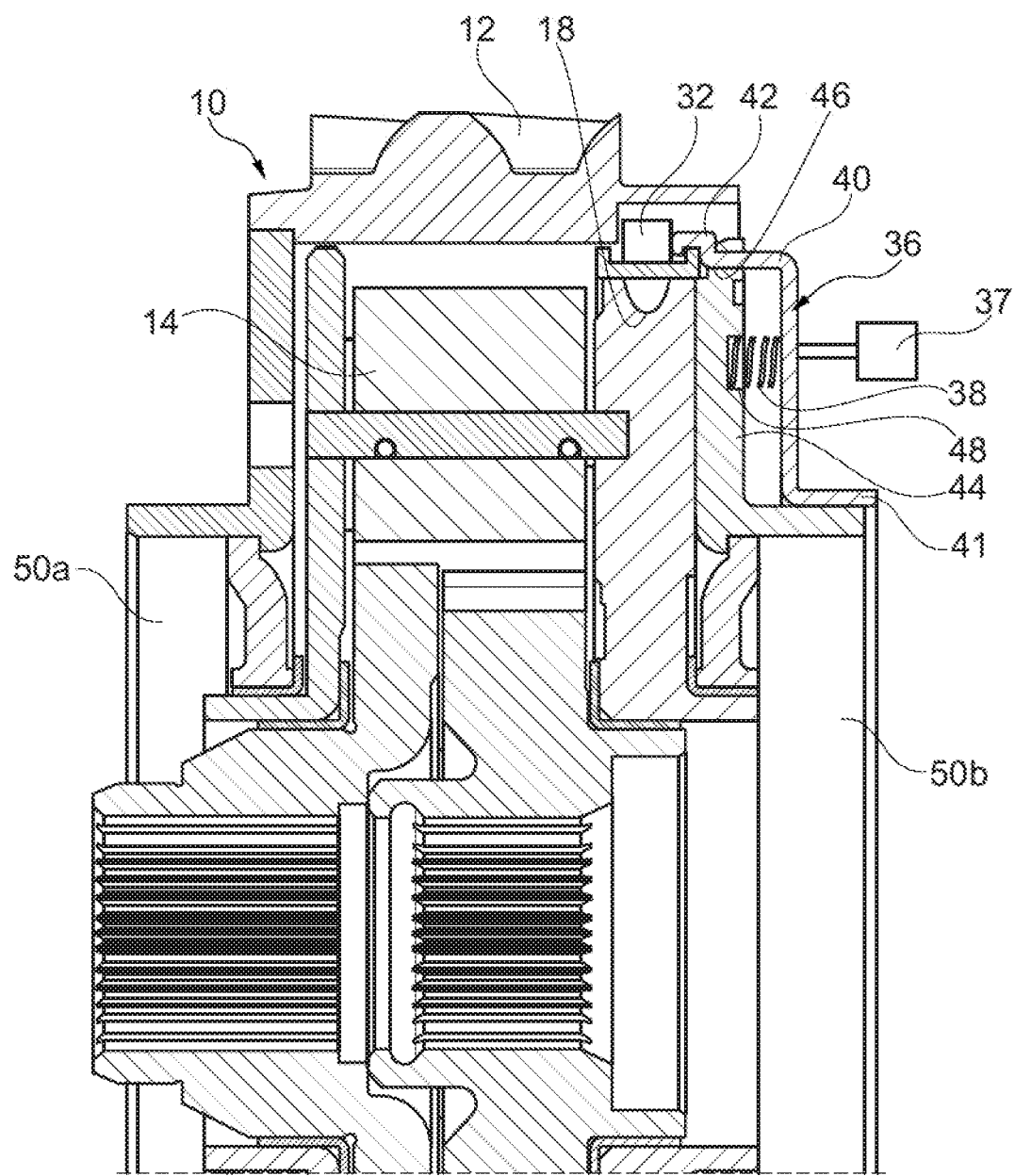
FIG. 2 is a cross sectional view of the differential arrangement of FIG. 1.
Figure 3:
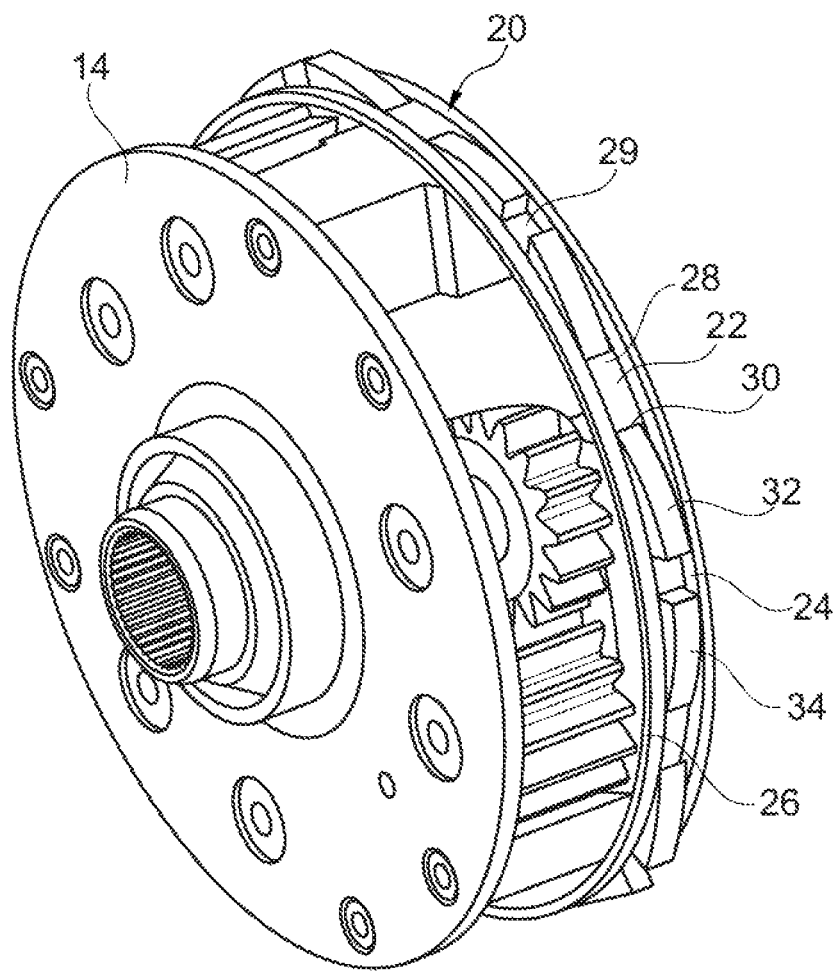
FIG. 3 is a perspective view of the differential assembly of the differential arrangement of FIGS. 1 and 2.
Figure 4:
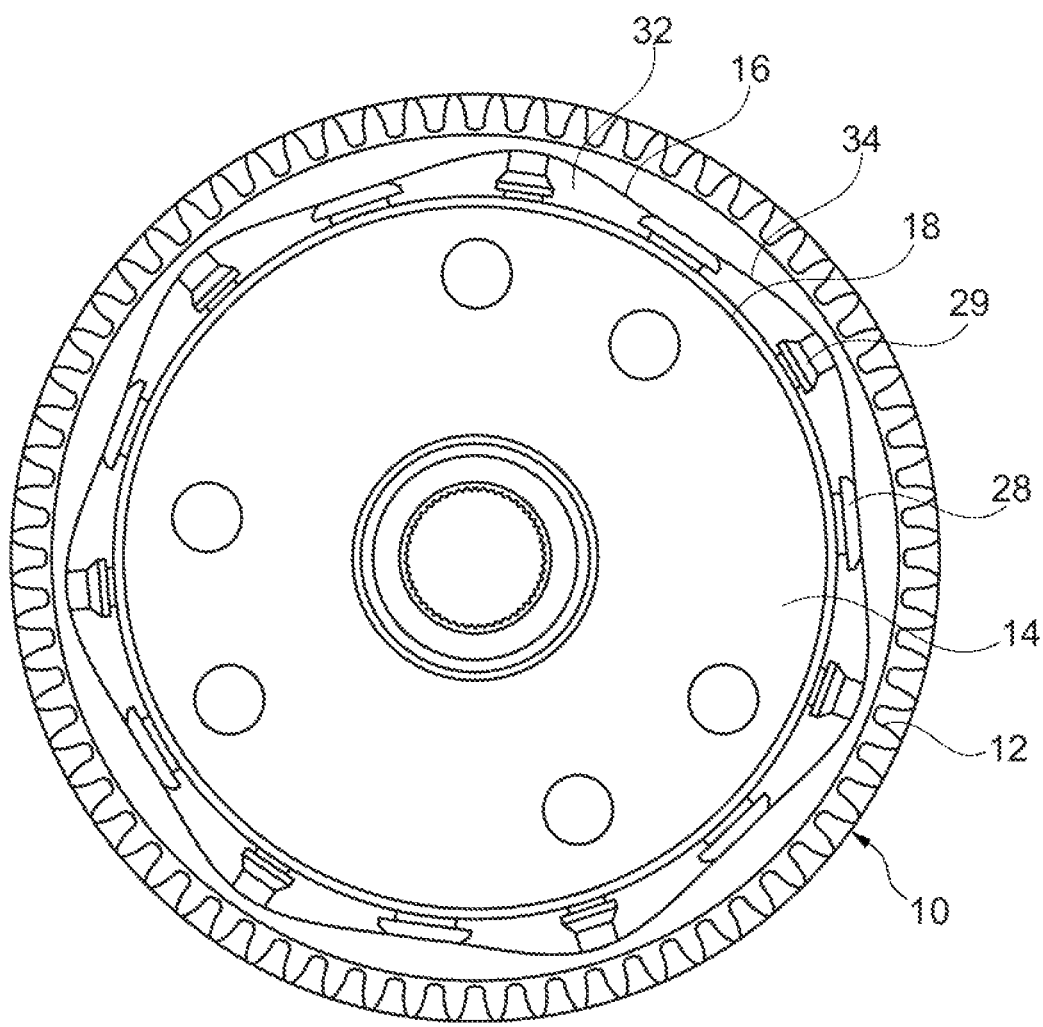
FIG. 4 is a front view of the differential arrangement of FIGS. 1-3.

As shown in FIGS. 1-4, a differential arrangement 10 is illustrated. The differential arrangement 10 includes an input drive gear 12 and a differential assembly 14 adapted to be selectively driven by the input drive gear 12. A first one of the input drive gear 12 or the differential assembly 14 includes a plurality of ramps 16, and a second one of the input drive gear or the differential assembly includes a circumferential groove 18. As shown in FIGS. 1 and 2, the input drive gear 12 includes the plurality of ramps 16, and the differential assembly 14 includes the circumferential groove 18. The differential assembly 14 is well known to those of ordinary skill in the art, such as disclosed in U.S. Pubs. 2017/0114871 and 2014/0335992, and U.S. Pat. No. 9,518,643, which are incorporated by reference.

Figure 5:
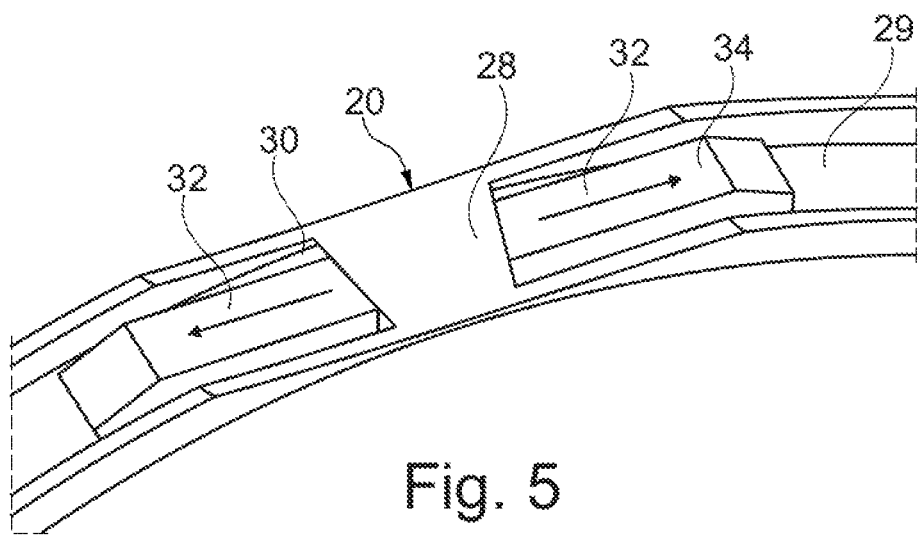
FIG. 5 is a magnified view of a cage of a wedge clutch assembly.

A wedge clutch assembly 20 is mounted on the differential assembly 14 and includes a cage 22 having a first radial flange 24, a second radial flange 26, and a first plurality of tapered crossbars 28 extending therebetween to at least partially define a plurality of tapered wedge pockets 30. A plurality of wedges 32 are each arranged within a respective one of the plurality of wedge pockets 30 and within the circumferential groove 18 of the second one of the input drive gear 12 or the differential assembly 14, and the plurality of wedges 32 each include a ramped surface 34 facing a corresponding one of the plurality of ramps 16. The plurality of ramps 16 each define a first profile, and the ramped surfaces 34 of the plurality of wedges 32 each define a second profile that is complementary to the first profile. The components of the wedge clutch assembly 20 are shown in more detail in FIG. 5.

An actuator assembly 36 is configured to move the cage 22 in at least one of a first axial direction or a second axial direction. Movement of the first plurality of tapered crossbars 28 in one of the first axial direction or the second axial direction circumferentially drives the plurality of wedges 32 into contact with the circumferential groove 18 such that the input drive gear 12 drives the differential assembly 14. In one embodiment, axial movement of the crossbars 28 circumferentially slides the wedges 32 along the associated ramps 16 and the wedges 32 are driven radially inward or outward with respect to the circumferential groove 18, such that the wedges 32 are selectively driven into contact with the circumferential groove 18.

An actuator 37 of the actuator assembly 36 is illustrated schematically in FIG. 2. In one embodiment, the actuator 37 is an electromagnetic actuator or a hydraulic actuator. One of ordinary skill in the art would recognize from the present disclosure that any type of actuator can be used.

In one embodiment, a biasing element 38 is configured to axially move the cage 22 in the second axial direction. In one embodiment, the cage 22 includes a second plurality of tapered crossbars 29 having a taper direction opposite to a taper direction of the first plurality of tapered crossbars 28, and movement in the other of the first direction or the second direction drives the plurality of wedges 32 out of contact with the circumferential groove 18 such that the input drive gear 12 freely rotates with respect to the differential assembly 14. One of ordinary skill in the art would recognize from the present disclosure that alternative arrangements of the actuator assembly 36 and the wedge clutch assembly 20 can be used, as long as the assemblies provide for a disconnect for the differential arrangement 10.

In one embodiment, the actuator assembly 36 includes an actuator plate 40 with axially extending hooks 42 that engage the cage 22. The actuator assembly 36 includes a radially extending body 39, with the axially extending hooks 42 extending from a radially outer end and an axially extending support surface 41 extending from a radially inner end of the radially extending body 39. The axially extending support surface 41 is supported against a support plate 44. The support plate 44 is optional, and one of ordinary skill in the art would recognize that the support plate 44 can be omitted. The support plate 44 is arranged adjacent to the actuator plate 40 and includes openings 46 configured to receive the hooks 42 of the actuator plate 40. The biasing element 38 is positioned between the support plate 44 and the actuator plate 40. In one embodiment, the support plate 44 includes a pocket 48 for receiving the biasing element 38. In one embodiment, the biasing element 38 is a coil spring. One of ordinary skill in the art would recognize from the present disclosure that alternative types of biasing elements can be used, such as a spring plate.

Support bearings 50a, 50b can be provided on both axial sides of the differential arrangement 10, as shown in FIG. 2. One of ordinary skill in the art would recognize from the present disclosure that the support bearings 50a, 50b can support the differential assembly 14, the support plate 44, and/or any other of the components of the differential arrangement 10.

Having thus described various embodiments of the present differential arrangement in detail, it is to be appreciated and will be apparent to those skilled in the art that many changes, only a few of which are exemplified in the detailed description above, could be made in the differential arrangement without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

Differential arrangement 10
Input drive gear 12
Differential assembly 14
Ramps 16
Circumferential groove 18
Wedge clutch assembly 20
Cage 22
First radial flange 24
Second radial flange 26
First plurality of tapered crossbars 28
Second plurality of tapered crossbars 29
Tapered wedge pockets 30
Wedges 32
Ramped surface 34
Actuator assembly 36
Actuator 37
Biasing element 38
Radially extending body 39
Actuator plate 40
Axially extending support surface 41
Axially extending hooks 42
Support plate 44
Openings 46
Pocket 48
Bearings 50a, 50b

What is claimed is:

1. A differential arrangement comprising:
an input drive gear;
a differential assembly adapted to be selectively driven by the input drive gear;
a first one of the input drive gear or the differential assembly includes a plurality of ramps, and a second one of the input drive gear or the differential assembly includes a circumferential groove;
a wedge clutch assembly including a cage having a first plurality of tapered crossbars that at least partially define a plurality of tapered wedge pockets, and a plurality of wedges each arranged within a respective one of the plurality of wedge pockets and within the circumferential groove of the second one of the input drive gear or the differential assembly, the plurality of wedges each including a ramped surface facing a corresponding one of the plurality of ramps;
an actuator assembly configured to move the cage in at least one of a first axial direction or a second axial direction; and
movement of the first plurality of tapered crossbars in one of the first axial direction or the second axial direction circumferentially drives the plurality of wedges into contact with the circumferential groove such that the input drive gear drives the differential assembly.

2. The differential arrangement of claim 1, further comprising a biasing element configured to move the cage in the second axial direction.

3. The differential arrangement of claim 2, wherein the actuator assembly includes an actuator plate with axially extending hooks that engage the cage.

4. The differential arrangement of claim 3, further comprising a support plate including openings, and the hooks of the actuator plate extend through the openings to engage the cage.

5. The differential arrangement of claim 4, wherein the biasing element is positioned between the support plate and the actuator plate.

6. The differential arrangement of claim 5, wherein the support plate includes a pocket for receiving the biasing element.

7. The differential arrangement of claim 2, wherein the biasing element is a coil spring.

8. The differential arrangement of claim 1, wherein the cage includes a second plurality of tapered crossbars having a taper direction opposite to a taper direction of the first plurality of tapered crossbars, and movement in the other of the first direction or the second direction drives the plurality of wedges out of contact with the circumferential groove such that the input drive gear freely rotates with respect to the differential assembly.

9. The differential arrangement of claim 1, wherein the plurality of ramps each define a first profile, and the ramped surfaces of the plurality of wedges each define a second profile that is complementary to the first profile.

10. The differential arrangement of claim 1, wherein the actuator assembly is an electromagnetic actuator or a hydraulic actuator.

11. The differential arrangement of claim 1, wherein the cage includes a first radial flange and a second radial flange with the first plurality of crossbars extending therebetween.

12. A method of driving a differential assembly, the method comprising:
   providing a differential arrangement including:
      an input drive gear;
      a differential assembly adapted to be selectively driven by the input drive gear;
      a first one of the input drive gear or the differential assembly includes a plurality of ramps, and a second one of the input drive gear or the differential assembly includes a circumferential groove;
      a wedge clutch assembly including a cage having a first plurality of tapered crossbars that at least partially define a plurality of tapered wedge pockets, and a plurality of wedges each arranged within a respective one of the plurality of wedge pockets and within the circumferential groove of the second one of the input drive gear or the differential assembly, the plurality of wedges each including a ramped surface facing a corresponding one of the plurality of ramps;
      an actuator assembly configured to move the cage in at least one of a first axial direction or a second axial direction; and
   driving the first plurality of tapered crossbars in one of the first axial direction or the second axial direction to circumferentially drive the plurality of wedges into contact with the circumferential groove such that the input drive gear drives the differential assembly.

13. The method of claim 12, further comprising a biasing element configured to move the cage in the second axial direction.

14. The method of claim 13, wherein the biasing element is a coil spring.

15. The method of claim 12, wherein the actuator assembly includes an actuator plate with axially extending hooks that engage the cage.

16. The method of claim 15, further comprising a support plate including openings, and the hooks of the actuator plate extend through the openings to engage the cage.

17. The method of claim 16, wherein the biasing element is positioned between the support plate and the actuator plate.

18. The method of claim 17, wherein the support plate includes a pocket for receiving the biasing element.

\* \* \* \* \*